United States Patent
Henon et al.

(10) Patent No.: US 10,394,025 B2
(45) Date of Patent: Aug. 27, 2019

(54) HEAD-UP DISPLAY DEVICE

(71) Applicant: VISTEON GLOBAL TECHNOLOGIES, INC., Van Buren Township, MI (US)

(72) Inventors: Fabrice Henon, Cergy (FR); Olivier Luneau, Auvers-sur-Oise (FR); David Renaudin, Us (FR)

(73) Assignee: VISTEON GLOBAL TECHNOLOGIES, INC, Van Buren Township, MI (US)

( * ) Notice: Subject to any disclaimer, the term of this patent is extended or adjusted under 35 U.S.C. 154(b) by 0 days.

(21) Appl. No.: 15/915,913

(22) Filed: Mar. 8, 2018

(65) Prior Publication Data
US 2018/0259772 A1 Sep. 13, 2018

(30) Foreign Application Priority Data
Mar. 9, 2017 (FR) ...................... 17 51923

(51) Int. Cl.
*G02B 27/01* (2006.01)
*B60K 37/02* (2006.01)

(52) U.S. Cl.
CPC .......... *G02B 27/0101* (2013.01); *B60K 37/02* (2013.01); *G02B 27/0149* (2013.01); *B60K 2350/2052* (2013.01); *B60R 2300/205* (2013.01); *G02B 2027/0141* (2013.01); *G02B 2027/0154* (2013.01)

(58) Field of Classification Search
CPC ........ G02B 27/0149; G02B 2027/0154; G02B 2027/0161; G02B 27/0101; B60K 37/02; B60K 2350/2052; B60R 2300/205
See application file for complete search history.

(56) References Cited

U.S. PATENT DOCUMENTS

| 7,978,414 | B2 | 7/2011 | Potakowskyj et al. |
|---|---|---|---|
| 2002/0012173 | A1 | 1/2002 | Aoki et al. |
| 2010/0157431 | A1* | 6/2010 | Montarou .......... G02B 27/0149 359/630 |
| 2014/0125085 | A1 | 5/2014 | Wakibayashi et al. |
| 2014/0320382 | A1 | 10/2014 | Moussa et al. |
| 2015/0123878 | A1 | 5/2015 | Kawasaki |
| 2016/0178901 | A1 | 6/2016 | Ishikawa |
| 2016/0259165 | A1 | 9/2016 | Dalmayrac et al. |

FOREIGN PATENT DOCUMENTS

| EP | 2982534 A1 | 2/2016 |
|---|---|---|
| FR | 2983314 A1 | 5/2013 |

OTHER PUBLICATIONS

International Search Report issued in French Patent Application No. 1751923 dated Oct. 16, 2017.

* cited by examiner

*Primary Examiner* — Ryan D Howard
(74) *Attorney, Agent, or Firm* — Quinn IP Law

(57) ABSTRACT

The present disclosure relates to a head-up display device comprising a pivoting and/or tilting combiner system, a projector system capable of generating information to be viewed, a mechanical actuation and drive system, a housing including a compartment and a fixed cover. The fixed cover includes a contact and sealing edge, and the device further includes a movable cover being mounted, preferably removable, on the support. The resultant device forms a contact seal preventing the passage of dust and other foreign elements between said contact and sealing edge and the movable cover.

16 Claims, 8 Drawing Sheets

HEAD-UP DISPLAY DEVICE

CROSS-REFERENCE TO RELATED APPLICATION

This application claims priority to French Patent Application No. 1751923 filed Mar. 9, 2017, and entitled "Head-up display device," which is herein incorporated by reference.

BACKGROUND

A head-up display, or HUD, is generally installed on the dashboard of a vehicle and is configured to provide the vehicle operator with information such as the speed of the vehicle or the route to follow by superimposing them on the external environment between the vehicle windshield and the driver. Thus, the driver can maintain all his or her attention while he/she monitors at the same time the information or data of the vehicle and his external environment through the windshield. There are also head-up displays installed in the cockpits of aircraft in the pilot's field of vision, whose process is the same or similar to that of the automobile.

A head-up display generally comprises a combiner, a projector system capable of generating information to be viewed and a housing that can be secured on or integrated into the dashboard of the vehicle. The projector system, which is frequently installed in the housing that receives the combiner, and sometimes outside the housing, includes a projector, that is to say a light source, capable of producing a light beam representative of the information or data to be viewed and associated optics for guiding the light beam to the combiner. The combiner, which consists of a transparent plate or transparent mirror, forms a transparent display screen capable of displaying the information carried by the light beam emitted by the projector.

In addition, in order to protect the combiner from dust or other foreign elements when not in use, the combiner is mounted retractably, generally by pivoting or tilting, in a compartment open to the outside provided in the housing. For this purpose, the combiner is mounted on a mobile support, guided and driven to pivot and/or tilt by means of a drive mechanism actuated by an electric motor, from a retracted or non-use position in the compartment, to a deployed or in-use position outside the compartment and the housing.

U.S. Pat. No. 7,978,414 discloses a head-up display device for a vehicle, said device comprising a housing receiving a pivoting combiner in a housing, said combiner being formed by a substantially flat glass or polymer substrate and being mounted on a support by clamping or blocking its base, that is to say of one of its sides. When mounted, the combiner presents a side facing the driver and an opposite side facing the windshield of the vehicle. The support consists of two walls or parts, namely a wall, called the front wall, and a wall, called the rear wall, each shaped with a profile corresponding to the profile of the combiner, and having a plane or slightly concave profile so as to follow the outline of the side or base arranged between the two walls. It further includes a projector, positioned above or below the combiner for projecting information on the combiner, and a positioning mechanism for pivoting and driving the combiner from a horizontally extending retracted or stored position inside the compartment, to a vertically extending deployed or in-use position for the purpose of displaying and viewing the data. The front wall is placed against the front face of the combiner and the rear wall is placed against the rear face of the combiner. Clamping or blocking the combiner in the support, particularly between the two walls, prevents the combiner from being bent or deformed or subjected to any other physical distortion during the periods when the combiner and the positioning mechanism are exposed to extreme high or low temperatures during use or storage. The two walls are fixed to the combiner by fastening means such as threaded elements, for example screws, or by gluing the walls and the combiner. The screws are engaged through the walls and the base of the combiner. The screw heads are on the side of the front wall and are screwed into threaded holes provided in the rear wall.

However, in a head-up display such as the one disclosed in the aforementioned U.S. Pat. No. 7,978,414, in the deployed or in-use position of the combiner, dust or other foreign elements penetrate the housing through gaps or openings between the latter and the combiner or the support and thus reach the mechanical and optical elements, negatively affecting their operation and/or requiring costly and difficult cleaning tasks. In addition, the screws, more particularly the heads of the screws, are visible in the in-use position of the combiner, which negatively affects the aesthetics of the device.

US Pat. No. 2014/012085 relates to a head-up display for a vehicle, said display comprising a semi-transparent mirror (combiner), pivotally movable, to display driving assistance information such as the speed of the vehicle or navigation data, a sending part (projector system) for sending and transmitting the information to the mirror, a motor for transmitting the rotational force to the mirror to move it in the open position (use or deployment) or closed position (retracted or stored). In the closed position, the mirror closes the opening of a compartment provided in a housing integrated in the upper part of the instrument panel of the vehicle or attached to said panel. The mirror is supported by a pivoting axle mechanically connected to the motor to receive the rotational force for pivoting the mirror, which is integral therewith, between its two, open and closed, positions. On the other hand, such a head-up display, in its implementation in a vehicle marketed under the name "Mazda 3 S" (https://www.youtube.com/watch?v=4SR6zNsjAPE), includes a fixed cover extending horizontally in the compartment of the housing. Such a fixed cover is adapted and intended to hide at least a portion of the mechanical and/or optical parts located in the compartment and is stationary relative to the combiner or to the axis or support of the pivoting combiner. The implementation of a display of this type can also be viewed on the following website: https://www.youtube.com/watch?v=e9xvI7keQIM.

However, in a head-up display of the type disclosed in US Pat. No. 2014/012085, in the deployed or in-use position of the combiner, dust or other foreign elements penetrate into the compartment through gaps or openings located between the combiner and the edge of the opening of the compartment or the fixed cover and thus reach the mechanical and optical elements, negatively affecting their operation and/or requiring costly and difficult cleaning tasks.

SUMMARY

The present disclosure aims to overcome these disadvantages by providing a head-up display device that will, in particular, allow for the prevention or limitation of the entry of dust and other foreign elements to the driving or positioning mechanical parts of the combiner and/or to the optics located in the compartment receiving the combiner, while masking the support and its eventual fastening elements such as screws.

For this purpose, the object of the present disclosure is a head-up display device comprising a pivoting and/or tilting combiner system, a projector system capable of generating and transmitting information to be viewed, a mechanical actuation and drive system and a housing having a compartment and a fixed cover, said combiner system comprising, on the one hand, a combiner retractably mounted in the compartment, said combiner allowing viewing said information and having an end side forming a fixing base, and, on the other hand, a pivoting and/or tilting support supporting the fixing base of said combiner, said mechanical actuation and drive system being functionally connected to said support to allow its pivoting and/or tilting from a position where the combiner is retracted into the compartment of the housing, to a position where the combiner is deployed outside the compartment for displaying the information, said combiner comprising an front face and a rear face, and being characterized in that the fixed cover has a contact and sealing edge and in that it further comprises a movable cover mounted, preferably removably, on the support extending at least between the latter and said contact and sealing edge, said movable cover comprising front wall having a rear face facing the support and an front face comprising at least one contact and sealing projection adapted to cooperate, in the deployed state of the combiner, with the contact and sealing edge by abutting against the latter to form a sealing contact, preventing the passage of dust and other foreign elements between said contact and sealing edge and the movable cover.

BRIEF DESCRIPTION OF DRAWINGS

The disclosure will be better understood, thanks to the following description, which relates to at least one preferred embodiment, given by way of non-limiting example, and explained with reference to the appended schematic drawings, in which.

DETAILED DESCRIPTION

Figure 1:
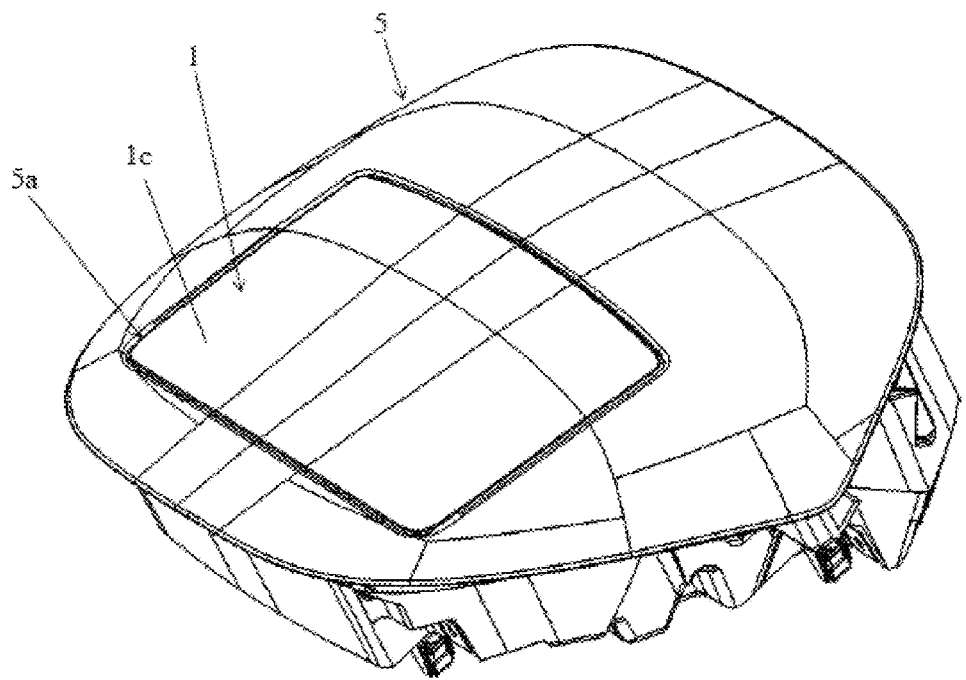
FIG. 1 is a perspective view of the head-up display device in the retracted or closed state of the combiner closing the compartment of the housing receiving it.
Figure 2:
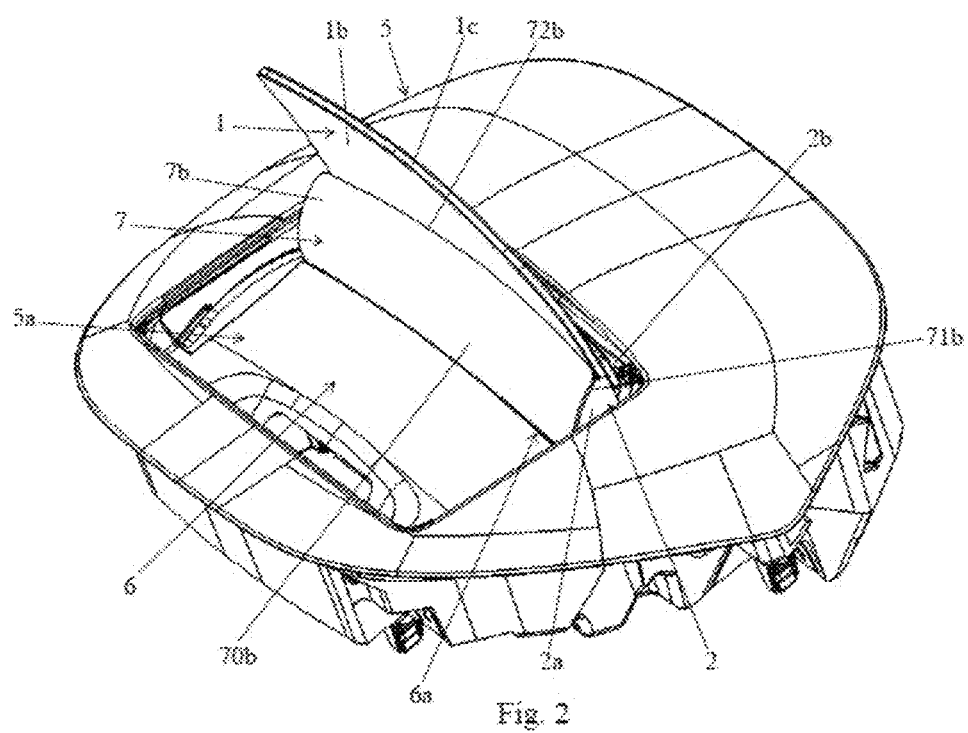
FIG. 2 shows the head-up display device shown in FIG. 1, in the deployed or open state of the combiner.

The figures show a head-up display device, according to the present disclosure, comprising a pivoting and/or tilting combiner system 1, 2, a projector system 4 capable of generating and transmitting information to be viewed, a mechanical actuation and drive system 3, a housing 5 having a compartment 5a and a fixed cover 6. The pivoting and/or tilting combiner system 1, 2 comprises, on the one hand, a combiner 1, retractably mounted in said compartment 5a of the housing 5, open for this purpose, said combiner 1 allowing viewing of said information and having an end side forming a fixing base 1a, and, on the other hand, a pivoting and/or tilting support 2, supporting said combiner 1 by its fixing base 1a. The mechanical actuation and drive system 3 is operatively connected to said support 2 to allow it to pivot and/or tilt from a position where the combiner 1 is retracted into the compartment 5a of the housing 5, to a position where the combiner 1 is deployed outside the housing 5 for the viewing of the information. The combiner 1 comprises or presents a front face 1b and a rear face 1c, that is to say, two opposite faces. When the head-up display device according to the present disclosure is mounted in a vehicle, for example, and in the deployed or open state of the combiner 1, the front face of the combiner 1 is facing the driver, while the rear face of the combiner 1 is facing the windshield of the vehicle.

It will be understood that the compartment 5a is open when coming out of the housing 5 to allow the passage of the combiner 1 from its retracted position in the compartment 5a to its deployed position outside the housing 5. In addition, it will be understood that the housing 5 may be designed to be added into or on the dashboard of a vehicle or aircraft or be integrated in said dashboard, the portion of the dashboard comprising the housing 5a then forming the housing 5 thus integrated.

According to the present disclosure, in such a head-up display device, the fixed cover 6, preferably integrated or added to the housing 5 or the compartment 5a, has a contact and sealing edge 6a Still in accordance with the present disclosure, such a head-up display device further comprises a movable cover 7 mounted, preferably removably, on the support 2, that is to say, being integral with the latter in pivoting and/or tilting, extending at least between the latter and said contact and sealing edge 6a. The movable cover 7 comprises a front wall 7b having two opposite faces, namely a rear face 71b facing the support 2 and an opposite front face 70b opposite to it. The front face 70b comprises at least one contact and sealing projection 7a capable of cooperating, in the deployed state of the combiner 1, with the contact and sealing edge 6a, while abutting against the latter to form a sealing contact, preventing the passage of dust and other foreign elements between said contact and sealing edge and the movable cover 6. It will be understood that the front face is facing the fixed cover 6. Preventing will be understood to mean significantly preventing or limiting the passage of dust or other foreign elements.

Figure 5:
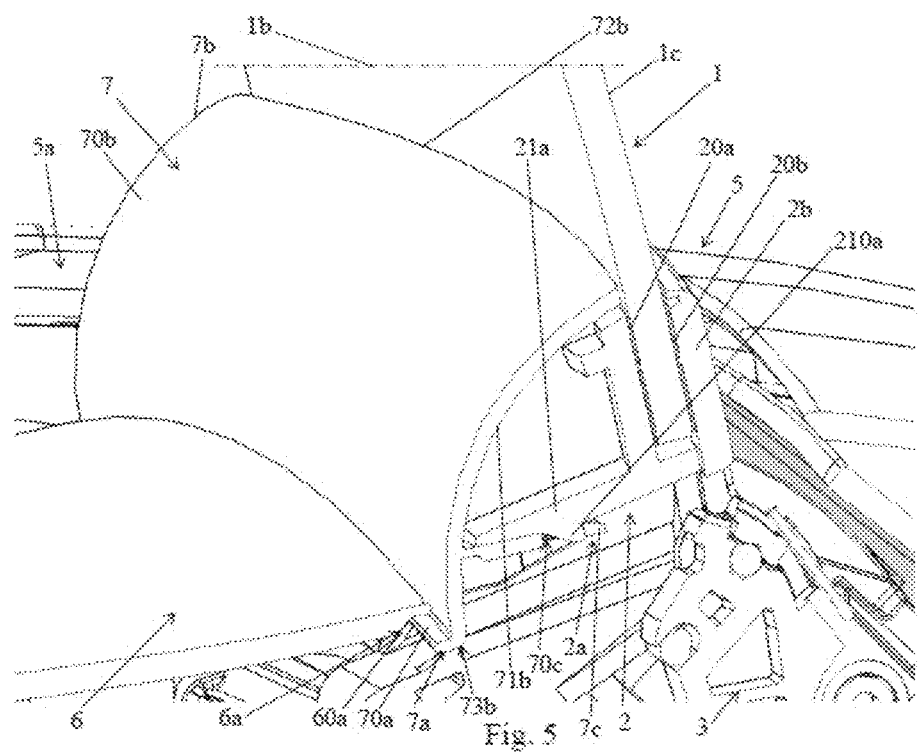
FIG. 5 is a detailed view of the head-up display device in the state shown in FIG. 2 and, in particular, the means for movably fixing the movable cover on the support, with a partial view of the combiner.
Figure 6:
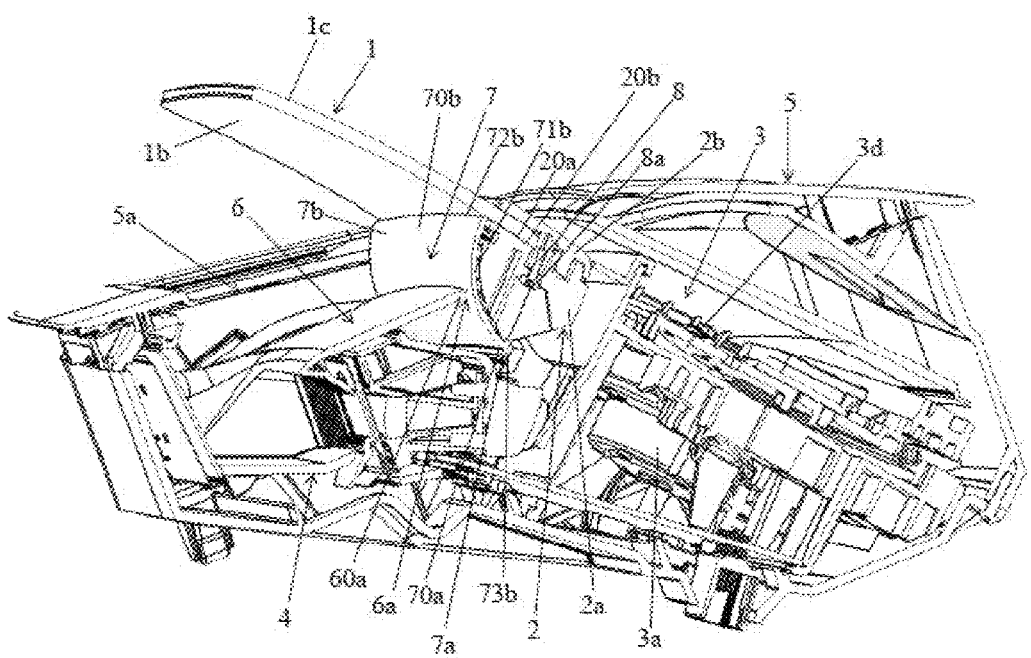
FIG. 6 shows the head-up display device shown in FIG. 3 during deployment or opening, that is to say, in an intermediate position between the retracted position and the deployed position of the combiner.
Figure 7:
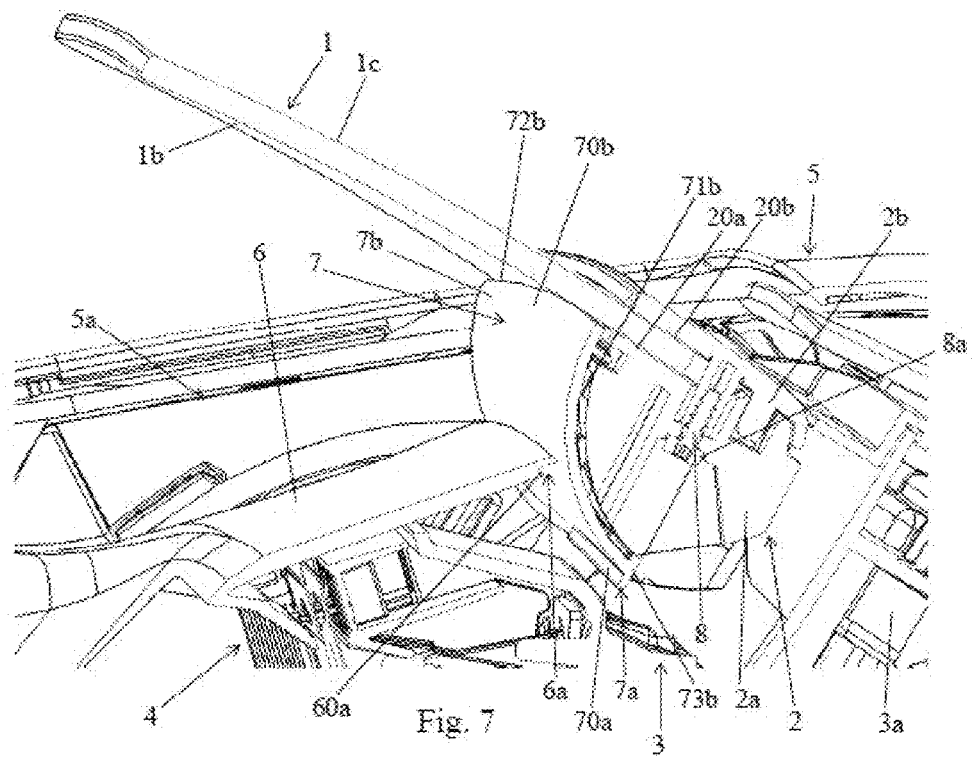
FIG. 7 is a detailed view of the head-up display device shown in FIG. 6, at the level of its movable cover removably mounted on the support and, more particularly, on the front portion of the support.

In a preferred embodiment, the front wall 7b may have, for example, a concave, rounded or circular shape so as to be, by its front face 70b, in contact with or close to the contact and sealing edge 6a of the fixed cover 6 (FIGS. 2, 3, 5, 6, 7, 8) and remain in contact with or close to said contact and sealing edge while the support 2 is pivoting (FIGS. 6 and 7).

Referring in particular to FIGS. 2, 3, 5, 6 and 7, it can be seen that, in a preferred embodiment, in order to cover the support 2 to hide it and/or prevent the creation of a gap between the cover 7 and the combiner 1 and/or limit the dimensions of such a gap that could allow the passage of dust and other foreign elements, the front wall 7b of the movable cover 7 can extend between a first end edge 72b which can be placed against the front face 1b of the combiner 1, preferably above the support 2, or which may be located close to the latter, preferably above the support 2, and a second end edge 73b which can be located under or at the contact and sealing projection 7a. The second end edge 73b may preferably be remote or located at a distance from the combiner 1 so as to allow the support 2 to be covered while limiting the surface dimensions between the first end edge and the second end edge.

Referring now in particular to FIGS. 3, 5, 6 and 7, it can be seen that the contact and sealing edge 6a of the fixed cover 6 and the contact and sealing projection 7a of the movable cover 7 may each comprise a contact and sealing face or a plurality of contact and sealing faces. Preferably, the or each contact and sealing face may be flat, curved or rounded.

The fixed cover 6 may be shaped as a plate comprising an inner face facing the bottom of the compartment 5a and an outer face facing away from it (FIGS. 2, 3, 4, 5, 6, 7). In the deployed position, the combiner 1 may be inclined or substantially perpendicular to said fixed cover (FIGS. 2, 3, 4, 5, 6, 7) and, in the retracted position, the combiner 1 may be parallel or substantially parallel or inclined with respect to the fixed cover 6 (FIG. 1).

Figure 3:
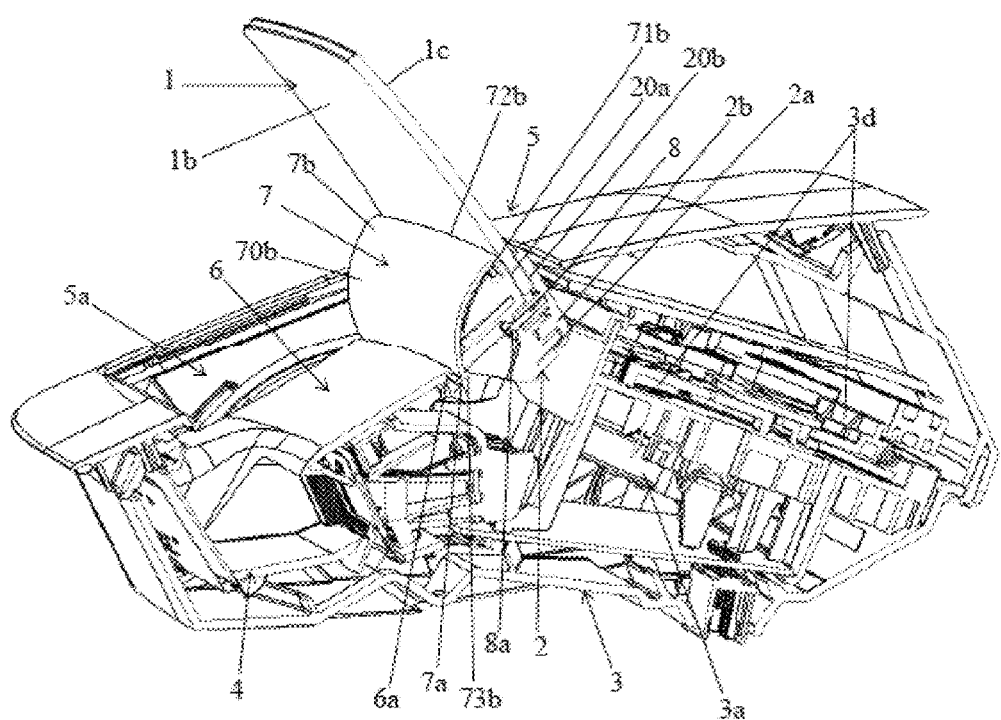
FIG. 3 is a perspective view of the head-up display device in the state shown in FIG. 2, partially showing the internal space of the housing and in particular the system for actuating and driving the support and combiner assembly and the projector system.
Figure 4:
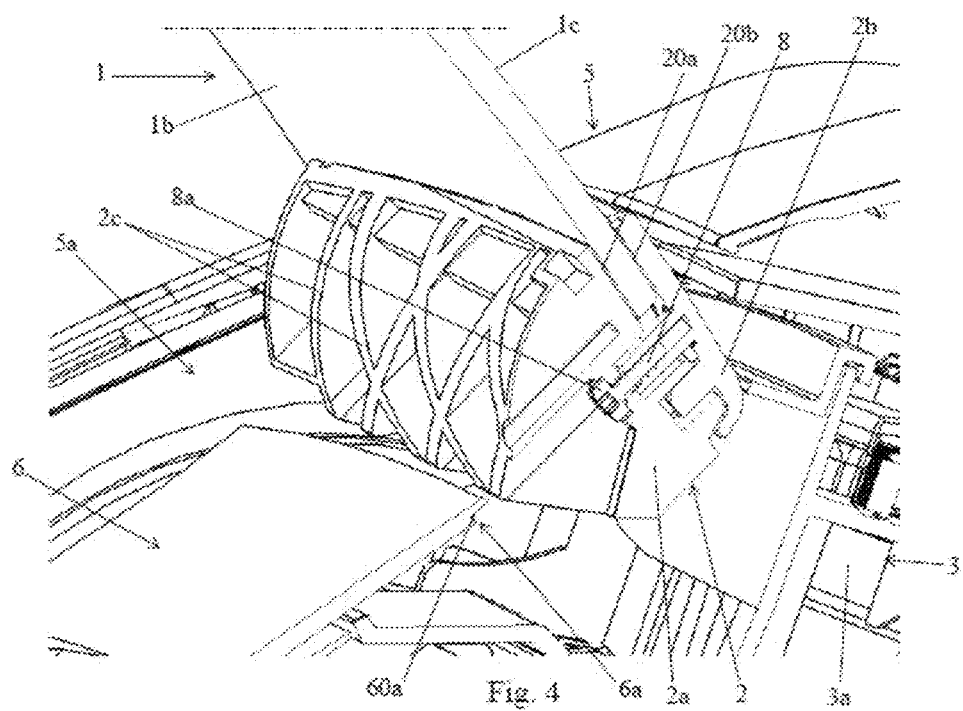
FIG. 4 is a detailed view of the head-up display device in the state shown in FIG. 2, without the movable cover, and showing the support on the front face of the combiner in a particular embodiment of said support, constituted by two support portions, respectively front and rear, ensuring the attachment of the combiner, by clamping and/or blocking of its fixing base between said portions and ribs or stiffening and/or reinforcing walls arranged in the front support portion.

In a preferred embodiment, the contact and sealing edge 6a may comprise first male or female interlocking means 60a (see in particular FIGS. 3, 4, 5, 6 and 7), and the contact and sealing projection 7a may comprise second complementary male or female interlocking means 70a (see in particular FIGS. 3, 5, 6 and 7) allowing, in the deployed state of the combiner 1, the cooperation of the contact and sealing end 6a and the contact and sealing projection 7a, by the interlocking of one into the other (FIGS. 3, 5 and 6).

Preferably, when referring to FIGS. 3, 4, 5, 6, 7, the first interlocking means 60a of contact and sealing edge 6a of the fixed cover 6 may be female interlocking means 60a and may consist of a cavity or a recess formed along the contact and sealing edge 6a, preferably on the side of the inner face of the fixed cover 6. Such a cavity or recess may be generally in the shape of an L, one of its branches forming a flat or curved face, preferably parallel or substantially parallel to the plane of the fixed cover, and forming an abutment for the contact and sealing projection 7a in the deployed state of the combiner 1. In addition, the second interlocking means 70a of the contact and sealing projection 7a may be male interlocking means and may consist of a rib extending along all or part, continuously or not, of the front face 70b of the movable cover 7 substantially parallel or parallel to said contact and sealing edge 6a or said cavity or recess 60a. The contact and sealing edge 6a and the contact and sealing projection 7a can thus preferably form an S-shaped junction for further strengthening the seal between the fixed cover 6 and the movable cover 7 in the deployed state of the combiner 1 in order to prevent the entry of dust and other foreign elements or objects.

The support 2 can be mounted so as to pivot and/or tilt around at least one pivoting and/or tilting axis. In addition, the contact and sealing edge 6a and the contact and sealing projection 7a may extend parallel or substantially parallel to said pivoting and/or tilting axis.

Figure 8:
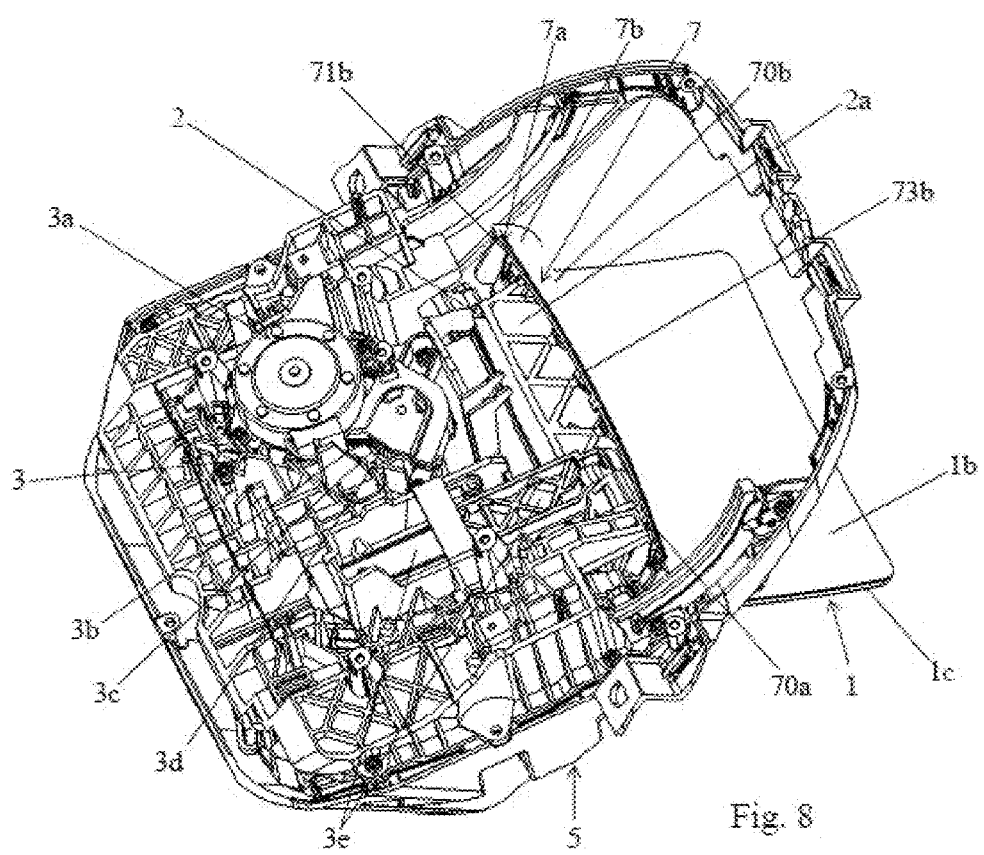
FIG. 8 is a partial view from below of the head-up display device shown in FIG. 1, showing, in particular, the mechanical system for actuating and driving the combiner and support assembly.

More particularly, as can be seen in FIGS. 3, 6 and 8, the mechanical actuation and drive system 3 may comprise a motor 3a, gearing means 3b, 3c such as gear wheels driven in rotation by said motor, a cam 3d driven by said gearing means and a lever 3e driven in linear displacement, preferably substantially perpendicular or perpendicular to the pivoting and/or tilting axis of the combiner, by said cam 3d which pushes or pulls the combiner 1 and support 2 assembly by being functionally connected thereto.

Preferably, in order to reinforce the rigidity of the support 2, the support 2 may comprise ribs or reinforcing walls 2c, being preferably integrally formed with at least a portion of the support 2 (see in particular FIG. 4). Preferably, such ribs or reinforcing walls 2c may be arranged in the front part of the support 2, that is to say, on the side of the front face 1b of the combiner 1.

In a preferred embodiment of the support 2, it may comprise two support portions 2a, 2b, namely a front support portion 2a and a rear support portion 2b, preferably fixed or assembled to each other, preferably by means of screws 8 and/or by gluing, between which support portions 2a, 2b, the fixing base 1a of the combiner 1 can be clamped and/or blocked. The front support portion 2a may comprise a bearing face 20a which can be placed against the front face 1b of the combiner, and the rear support portion 2b, which may comprise a bearing face 20b, may be placed against the rear face 1c of the combiner 1 so as to be able to fix or assemble the combiner 1 by clamping and/or blocking its fixing base 1a between said support portions 2a, 2b (see in particular FIGS. 3, 4, 5, 6 and 7).

Preferably, the two support portions 2a, 2b, respectively front and rear of the support 2, can be fixed or preferably assembled to each other by means of at least one screw 8 so as to ensure the clamping and/or blocking of the fixing base 1a of the combiner 1 between said support portions 2a, 2b (see in particular FIGS. 3, 4, 5, 6 and 7). As can be seen in these figures, and more particularly in FIG. 4, such a screw 8 may, for example, freely pass through the front support portion 2a, and be screwed into the rear support portion 2b. It can also be seen from these figures that each screw 8 may comprise a screw head 8a which may preferably be located on the side of the front support portion 2a, that is to say, on the side of the front face 1b of the combiner 1. The movable cover 7 allows masking the screws 8 and the screw heads 8a so that, in the deployed state of the combiner 1, the latter are no longer visible.

Referring now more particularly to FIGS. 3, 4, 6, 7, 8, it can be seen that the reinforcing ribs or walls 2c may be arranged, if necessary, in the front support portion 2a and/or in the rear support portion 2b, preferably in the front support portion 2a. The reinforcing ribs or walls 2c may be integrally formed with the corresponding support portion 2a or 2b, preferably, as can be seen in said appended figures, in the front support portion 2a.

Preferably, as can be seen in FIG. 5, the present disclosure may provide that the movable cover 7 be removably mounted on the support 2, possibly on the front support portion 2a, by removable fastening means 7c, 21a, that is to say, for example, by elastic interlocking. Such removable fastening means 7c, 21a may comprise first elastic interlocking elements 7c fixed on the rear face 71b of the front wall 7b of the movable cover 7, and second elastic interlocking elements 21a fixed on the front side of the support 2, possibly on the front support portion 2a of the support 2. The second elastic interlocking elements 21a may consist of at least one relief or a cone 210a and the first elastic interlocking elements 7c may consist of at least one hole or a bore or a cavity 70c adapted to receive, during the elastic interlocking or latching, the or one of the reliefs or cones 210a. The disconnection can be achieved by providing an inclined surface on the relief or cone 210a and/or by elastic deformation of the parts. The term 'elastic interlocking' should also include known terms such as for example: latching or "snap fit".

It is obvious that the disclosure is not limited to the embodiment(s) described and shown in the accompanying drawings. Modifications are possible, especially from the point of view of the make-up of the various elements or by substitution of technical equivalents, without departing from the scope of protection of the disclosure.

The invention claimed is:

1. A head-up display device, comprising:
    a combiner system;
    a projector system configured to generate information to be viewed;
    a mechanical actuation and drive system;
    a housing having a compartment and a fixed cover,
    wherein the fixed cover includes a contact and sealing edge, a movable cover mounted thereon, removable on a support extending at least between the movable cover and the contact and sealing edge,
    the movable cover having a front wall, the front wall having a rear face facing the support and a front face comprising at least one contact and sealing projection adapted to cooperate, in a deployed state of the combiner with the contact and the sealing edge by abutting against the sealing edge to form a contact seal.

2. The head-up display device according to claim 1, wherein the front wall has a concave, rounded or circular shape.

3. The head-up display device according to claim 1, wherein the front wall of the movable cover extends between a first end edge placed against the front face of the combiner above the support, and a second end edge located under or at the contact and sealing projection.

4. The head-up display device according to claim 2, wherein the front wall of the movable cover extends between a first end edge placed against the front face of the combiner above the support, and a second end edge located under or at the contact and sealing projection.

5. The head-up display device according to claim 1, wherein the contact and sealing edge and the contact and sealing projection each comprise one contact and sealing face, and each contact and sealing face being flat.

6. The head-up display device according to claim 1, wherein the contact and sealing edge and the contact and sealing projection each comprise one contact and sealing face, and each contact and sealing face being curved.

7. The head-up display device according to claim 1, wherein the contact and sealing edge comprises a first male or female interlocking means, and the contact and sealing projection comprises a second complementary male or female interlocking means.

8. The head-up display device according to claim 1, wherein the support is mounted so as to pivot and/or tilt around at least one pivoting and/or tilting axis and in that the contact and sealing edge and the contact and sealing projection extend substantially parallel to said pivoting axis.

9. The head-up display device according to claim 1, wherein the support comprises reinforcing elements integrally formed on the side of the front face.

10. The head-up display device according to claim 1, wherein the support comprises a front support portion and a rear support portion, fastened to one another, between which a fixing base of the combiner is clamped, the front support portion having a bearing face placed against the front face of the combiner and the rear support portion having a bearing face placed against the rear face of the combiner.

11. The head-up display device according to claim 10, wherein the two support portions, respectively front and rear of the support, are fastened to one another by means of at least one screw.

12. The head-up display device according to claim 11, wherein each screw comprises a screw head located on the side of the front support portion.

13. The head-up display device according to claim 9, wherein the support comprises a front support portion and a rear support portion, fastened to one another, between which a fixing base of the combiner is clamped, the front support portion having a bearing face placed against the front face of the combiner and the rear support portion having a bearing face placed against the rear face of the combiner.

14. The head-up display device according to claim 13, wherein the two support portions, respectively front and rear of the support, are fastened to one another by means of at least one screw.

15. The head-up display device according to claim 14, wherein each screw comprises a screw head located on the side of the front support portion.

16. The head-up display device according to claim 15, wherein the reinforcing elements are formed in the front support portion or in the rear support portion, said reinforcing elements being integrally formed with said corresponding support portion.

* * * * *